Patented Nov. 15, 1938

2,136,949

UNITED STATES PATENT OFFICE 2,136,949

ACCELERATION OF VULCANIZATION OF RUBBER

Ludwig Orthner, Leverkusen-on-the-Rhine, and Ewald Zaucker, Cologne-Mulheim-on-the-Rhine, Germany, assignors to I. G. Farbenindustrie Aktiengesellschaft, Frankfort-on-the-Main, Germany No Drawing. Original application June 23, 1931, Serial No. 546,418. Divided and this application July 1, 1932, Serial No. 620,526. In Germany June 30, 1930

9 Claims. (Cl. 18—53)

The present invention relates to a process of vulcanizing rubber and to the vulcanizates obtainable by said process.

Mercaptoarylenthiazoles have already been suggested for accelerating vulcanization. This class of substances possesses, however, the disadvantage of an unfavorable critical temperature, that is to say, the use thereof involves the danger of scorching.

In accordance with the present invention natural rubber or artificial rubber-like masses obtainable, for example, by polymerizing butadiene or another homologue or an analogue of butadiene, are vulcanized with the addition of new vulcanization accelerators, possessing considerably more favorable critical temperatures, said new vulcanization accelerators having the probable general formula

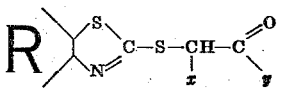

wherein R stands for a benzene or naphthalene nucleus, which may be substituted by monovalent substituents, for example, by alkyl, alkoxy, halogen or nitro groups, $x$ stands for hydrogen or a $\mu$-mercaptoarylenethiazole radical being attached with the sulfur atom of the mercapto group to the carbon atom of the CH-group, and $y$ stands for alkyl or aryl, which may be substituted, or an amino group, which may likewise be substituted.

These new accelerators are obtainable by reacting upon an about molecular quantity of a compound of the general formula:—

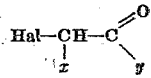

wherein Hal stands for a halogen atom, $x$ stands for hydrogen and $y$ stands for alkyl or aryl, which may be substituted or an amino group, which may likewise be substituted, with about one molecular proportion of a mercaptoarylenethiazole or a salt thereof in case $x$ represents hydrogen in the second general formula, or with about two molecular proportions of a $\mu$-mercaptoarylenethiazole or a salt thereof in case $x$ represents halogen in the above second general formula, said process of manufacture being more fully described in the annexed examples.

As suitable compounds of the general formula

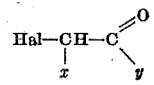

coming into consideration for the purpose of our invention, there may be mentioned by way of example:—

Chloroacetone:
Chloromethyl-ethylketone:
As. dichloroacetone:
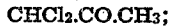
Sym. dichloroacetone:
$\gamma$-Bromoacetoacetic acid ethyl ester:
$\gamma$-Iodine acetoacetic acid methylester:
$\Omega$-Bromoacetophenone:
$\Omega$-Chloro-nitroacetophenone:
$\Omega$-Chloro-para-methyl-acetophenone:
Dichloroacet-amide:
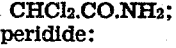
N-dichloro-acet-piperidide:
Dichloro-acet-anilide:
N-dichloro-acetyl-anthranilic acid ethyl ester:
Dichloroacetyl-dimethylamide:
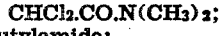
Dichloroacetyl-dibutylamide:
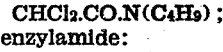
Dichloroacetyl-dibenzylamide:
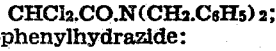
As. dichloroacetyl-phenylhydrazide:
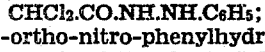
As. dichloro-aceto-ortho-nitro-phenylhydrazide:
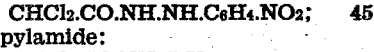
Dichloro-acetylpropylamide:

The new accelerators are generally colorless to yellowish colored crystalline substances, insoluble in water, soluble in the usual organic solvents, and are particularly valuable in view of their favorable critical temperatures.

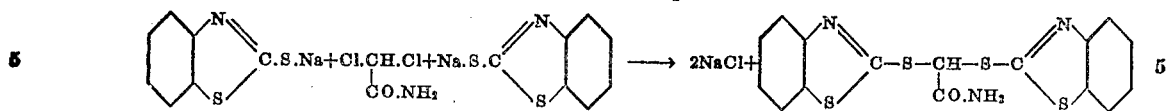

For vulcanization purposes the new vulcanization accelerators are incorporated within the rubber (which term is intended to include natural rubber as well as artificial rubber-like masses, derived for example, from butadiene, isoprene, dimethylbutadiene or another homologue or an analogue of butadiene) in any desired manner, for example, by rolling or kneading. Obviously, a vulcanizing agent, such as sulfur, agents being capable of splitting off sulfur, selenium etc., is likewise added, and, if desired, other ingredients known to favorably influence rubber vulcanization processes or the properties of the vulcanizates, may be admixed to the vulcanization mixture. The latter is then vulcanized in the usual manner by heating it to a temperature sufficient to perform vulcanization, for example, to a temperature between about 100–170° C.

Representative of this new class of accelerators, which possess too low a velocity on hot vulcanization, can be adjusted to give more favorable times of heating by combination with stearic acid and/or with appropriate accelerators of classes other than that of the present invention, especially basic accelerators, while preserving a satisfactory critical temperature.

The following examples will illustrate the invention, without, however, restricting it thereto:—

*Example 1*

To a solution of 100 grams of μ-mercaptobenzothiazole and 24 grams of sodium hydroxide in 200 ccs. of methyl alcohol, 55 grams of chloroacetone are dropped while stirring and while cooling with ice. The mixture is then boiled for several hours and, after reaction is finished, poured on to ice water. After recrystallization from ethyl ether the reaction product obtained has the melting point of 70° C. The reaction performs according to the probable equation:—

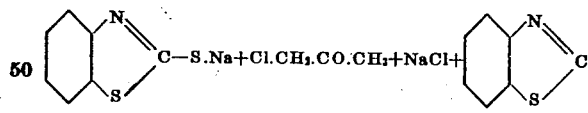

*Example 2*

When substituting in Example 1 the 55 grams of chloroacetone by a solution of 38 grams of sym.-dichloroacetone into 50 ccs. of acetone and on pouring the mixture into water after a short time's boiling, the reaction product obtained after recrystallization from benzine has the melting point of 129° C. This reaction proceeds according to the probable equation:—

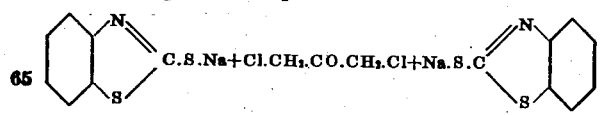

*Example 3*

100 grams of μ-mercaptobenzothiazole are boiled with 24 grams of sodium hydroxide in 200 ccs. of methyl alcohol and 38.4 grams of dichloroacetamide for 5 hours. After that the reaction product is precipitated with water. After recrystallization from propyl alcohol the reaction product obtained has the melting point of 179° C. The reaction proceeds according to the probable equation:—

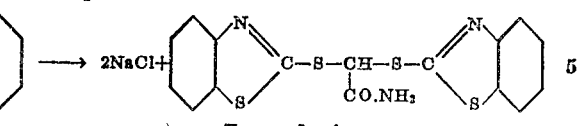

*Example 4*

In comparison with mercaptobenzothiazole (I), the condensation products from mercaptobenzothiazole (sodium salt) and beta-dichloroacetone (II), as.-dichloroacetone (III) and dichloroacetamide (IV) were tested as accelerators in the following mixture:—

| | Parts by weight |
|---|---|
| Crepe | 100 |
| Zinc oxide | 5 |
| Sulfur | 3 |
| Stearic acid | 1.5 |

1 part by weight of accelerator
or 0.8 part by weight of accelerator for as.-dichloroacetone (III)

The following figures were obtained:—

A=tensile strength in kg. per sq. cm.
B=stretch in percent.

| Heating | | I | | II | | III | | IV | |
|---|---|---|---|---|---|---|---|---|---|
| Press. above atm. | Minutes | A | B | A | B | A | B | A | B |
| 0.5 | 30 | 59 | 948 | | | 15 | 1092 | | |
| 3 | 15 | 155 | 832 | 87 | 989 | 140 | 820 | 140 | 880 |
| 3 | 35 | 156 | 808 | 140 | 869 | 140 | 770 | 174 | 818 |

With a mixture of the composition:—

| | Parts by weight |
|---|---|
| Crepe | 100 |
| Zinc oxide | 5 |
| Sulfur | 3 |
| Stearic acid | 1.5 | and 0.67 part by weight of mercaptobenzothiazole acetonyl ether+0.33 part by weight of diphenylguanidine (V)

or 0.33 part by weight of the reaction product of mercaptobenzothiazole (sodium salt) with dichloroacetamide+0.67 part by weight of diphenylguanidine (VI)

the following figures were obtained:—

| Heating | | V | | VI | |
|---|---|---|---|---|---|
| Press. above atm. | Minutes | A | B | A | B |
| 0.5 | 30 | 96 | 1045 | | |
| 3.0 | 15 | 193 | 814 | 232 | 820 |
| 3.0 | 35 | 219 | 765 | 242 | 740 |
| 3.0 | 50 | 205 | 235 | 235 | 720 |

This is a division of our co-pending application Serial No. 546,418, filed June 23, 1931.

We claim:—

1. The process which comprises incorporating within rubber a vulcanizing agent and a compound of the formula:—

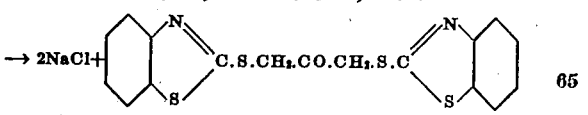

and vulcanizing the mixture.

2. The process which comprises incorporating within rubber a vulcanizing agent, a basic accelerator and a compound of the formula:—

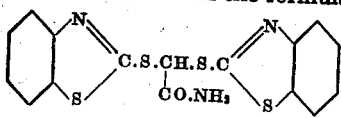

and vulcanizing the mixture.

3. The process which comprises incorporating within rubber a vulcanizing agent, diphenylguanidine and a compound of the formula:—

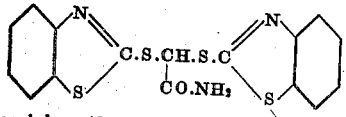

and vulcanizing the mixture.

4. The vulcanizates obtainable in accordance with the process claimed in claim 1.

5. The vulcanizates obtainable in accordance with the process claimed in claim 2.

6. The vulcanizates obtainable in accordance with the process claimed in claim 3.

7. A process of accelerating the vulcanization of rubber that comprises vulcanizing in the presence of carbamyl methyl di(benzothiazyl 1-sulphide).

8. A process of accelerating the vulcanization of rubber that comprises vulcanizing in the presence of a carbamyl methyl benzothiazyl 1-sulphide.

9. A process of accelerating the vulcanization of rubber that comprises vulcanizing in the presence of a carbamyl methyl benzothiazyl 1-sulphide and a basic organic nitrogen-containing accelerator.

LUDWIG ORTHNER.
EWALD ZAUCKER.